(12) United States Patent
Cheung et al.

(10) Patent No.: US 11,444,943 B1
(45) Date of Patent: Sep. 13, 2022

(54) EXCHANGE CONTENT BETWEEN CLIENT DEVICES WHEN A CLIENT DEVICE DETERMINES A USER IS WITHIN A FIELD OF VIEW OF AN IMAGE CAPTURE DEVICE OF THE CLIENT DEVICE AND AUTHORIZED TO EXCHANGE CONTENT

(71) Applicant: Meta Platforms, Inc., Menlo Park, CA (US)

(72) Inventors: Vincent Charles Cheung, San Carlos, CA (US); Connie Yeewei Ho, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 48 days.

(21) Appl. No.: 16/235,558

(22) Filed: Dec. 28, 2018

Related U.S. Application Data (63) Continuation-in-part of application No. 15/855,211, filed on Dec. 27, 2017, now abandoned.

(51) Int. Cl.
*H04L 9/40* (2022.01)
*G06F 21/44* (2013.01)
*H04L 65/1066* (2022.01)

(52) U.S. Cl.
CPC ........ *H04L 63/0869* (2013.01); *G06F 21/445* (2013.01); *H04L 63/0861* (2013.01); *H04L 65/1066* (2013.01)

(58) Field of Classification Search
CPC ............ H04L 63/0869; H04L 63/0861; H04L 65/1066; G06F 21/445
See application file for complete search history.

(56) References Cited

U.S. PATENT DOCUMENTS

| | | | | |
|---|---|---|---|---|
| 9,532,004 | B1 * | 12/2016 | Metter | ................ H04L 65/1096 |
| 2006/0177021 | A1 * | 8/2006 | Delaney | ............... G06Q 10/107 |
| | | | | 379/88.13 |
| 2013/0065569 | A1 * | 3/2013 | Leipzig | ................... H04W 4/16 |
| | | | | 455/416 |
| 2019/0034701 | A1 * | 1/2019 | Kerger | ............... G06K 9/00268 |

FOREIGN PATENT DOCUMENTS

CN 106412264 A * 2/2017

\* cited by examiner

*Primary Examiner* — Joshua D Taylor
(74) *Attorney, Agent, or Firm* — Fenwick & West LLP (57) ABSTRACT

Various client devices include displays and one or more image capture devices configured to capture video data. Different users of an online system are associated with client devices that exchange information captured by their respective image capture devices. A receiving client device includes information identifying one or more users of an online system authorized to exchange video data with the receiving client device when the receiving client device determines a receiving user is within a field of view of the receiving client device. Video data is exchanged between the receiving client device and a client device associated with a user authorized to exchange video data without the receiving user providing an input to the receiving client device to accept the video data exchange.

20 Claims, 3 Drawing Sheets

EXCHANGE CONTENT BETWEEN CLIENT DEVICES WHEN A CLIENT DEVICE DETERMINES A USER IS WITHIN A FIELD OF VIEW OF AN IMAGE CAPTURE DEVICE OF THE CLIENT DEVICE AND AUTHORIZED TO EXCHANGE CONTENT

CROSS REFERENCE TO RELATED APPLICATIONS

This application is a continuation-in-part of co-pending U.S. application Ser. No. 15/855,211, filed Dec. 27, 2017, which is incorporated by reference in its entirety.

BACKGROUND

This disclosure relates generally to capturing video data, and more specifically to exchanging content between different client devices when a client device includes information identifying users authorized to exchange content with the client device.

Increasingly, client devices, online systems, and networks allow users to exchange larger amounts of content with each other. For example, an online system allows its users to exchange video contents via client devices associated with the user. In a specific example, an online system may establish video messaging between a user and an additional user, allowing the users to exchange video data captured by their respective client devices in real-time or in near real-time.

However, conventional client devices do not exchange video data or other data with each other unless users provide specific interactions to different client devices for the client devices to exchange data. For example, a sending user interacts with a sending client device to identify a receiving user and again interacts with the sending client device to send a request to a receiving client device associated with the receiving user. Upon receiving the request, the receiving client device prompts the receiving user for an interaction to accept the request and exchanges data with the sending client device after receiving the interaction from the receiving user. Limiting exchange of content between client devices until both client devices receive interactions from their respective users delay exchange of content between users via client devices or decrease a likelihood of users exchanging content via different client devices because a user does not directly interact with a client device or is delayed in interacting with a client device.

SUMMARY

Various client devices associated with users of an online system include one or more image capture devices. An image capture device included in a client device is configured to capture video data of a local area surrounding the client device, based on a user's setting and authorization. In various embodiments, a receiving client device includes an image capture device configured to capture video data or image data of a local area surrounding the receiving client device, while a sending client device also includes an image capture device configured to captured video data or image data of a local area surrounding the sending client device.

Additionally, the receiving client device obtains information identifying one or more users of an online system who are authorized to exchange video data with the receiving client device. In various embodiments, a receiving user associated with the receiving client device provides information identifying the one or more users authorized to exchange video data with the receiving client device to the receiving client device, which locally stores the information identifying the one or more users authorized to exchange video data with the receiving client device. Alternatively, the receiving user provides information identifying the one or more users authorized to exchange video data with the receiving client device to the online system, which stores the information identifying the one or more users authorized to exchange video data with the receiving client device in association with the receiving user. For example, the online system stores the information identifying the one or more users authorized to exchange video data with the receiving client device in a user profile maintained for the receiving user. The receiving client device retrieves the information identifying the one or more users authorized to exchange video data with the receiving client device in various embodiments. In some embodiments, the receiving client device periodically retrieves the information identifying the one or more users authorized to exchange video data with the receiving client device and subsequently stores the retrieved information.

In various embodiments, different information identifying the one or more users authorized to exchange video data with the receiving client device is obtained by the receiving client device. Additional information may be associated with information identifying a user authorized to exchange video data with the receiving client device in various embodiments. For example, a time interval is associated with information identifying a user authorized to exchange video data with the receiving client device to indicate that the user is authorized to exchange video data with the receiving client device during the time interval, but not during times other than the time interval. As another example, a connection with the receiving user via the online system is associated with information identifying a user authorized to exchange video data with the receiving client device to indicate that the user is authorized to exchange video data with the receiving client device while the user is connected to the viewing user via the online system. In another example, an action is associated with information identifying a user authorized to exchange video data with the receiving client device to indicate that the user is authorized to exchange video data with the receiving client device if the online system maintains information indicating the user has performed the action. However, any suitable criteria may be associated with information identifying a user authorized to exchange video data with the receiving client device, limiting the user's authorization to exchange video data with the receiving client device unless characteristics associated with the user satisfy at least a threshold amount of the criteria.

Alternatively or additionally, information identifying one or more users of the online system who are authorized to exchange video data with the receiving client device comprises one or more rules, with each rule specifying one or more criteria. When at least a threshold amount of criteria specified by a rule are satisfied by characteristics of a user of the online system maintained by the online system, the user is authorized to exchange video data with the receiving client device. This allows users of the online system having particular characteristics to be authorized to exchange video data with the receiving client device. Example criteria specified by a rule include: a connection to the receiving user maintained by the online system, a connection to an object maintained by the online system, an action stored by the online system in association with the user authorized to exchange video data with the receiving client device, and a connection to a specific user of the online system. Criteria specified by a rule may also include information obtained from one or more third party systems. However, any suitable criteria may be specified by one or more rules to identify users who are authorized to exchange video data with the receiving client device. Additionally, criteria specified by a rule include information identifying a user and information maintained by the online system in association with the receiving user associated with the receiving client device or other information. For example, a rule identifies a user and an event associated with the receiving user by the online system, so the identified user is authorized to exchange video data with the receiving client device during the event. As another example, a rule identifies a user and an appointment maintained by the online system to authorize the user to exchange video data with the receiving client device during the appointment, but not at other times. Any suitable information maintained by the online system may be included in criteria of a rule, allowing the receiving user to leverage information maintained by the online system to identify users who are authorized to exchange video data with the receiving client device or restrictions on when users are authorized to exchange video data with the receiving client device.

The client device and the online system may individually and/or cooperatively maintain and enforce one or more privacy settings for users and other people with respect to identifying one or more users of the online system in various embodiments. For example, a client device may have a default privacy setting preventing the client device from identifying a user until the user manually alters the privacy setting to allow the client device to identify the user. The default privacy setting may also extend to any captured video data, audio data, image data, or other data so that a user may select whether to allow the client device's image capture device to identify any user in the data. Additionally, the privacy setting also regulates transmission of information between the client device and the online system. The various privacy settings allow a user to control the identification of the user and the storage and sharing of any user-related data to prevent data from sending to the online system without the user's authorization. The privacy settings also may be enforced individually with respect to each individual user. For example, a user opting in a user identification feature may not change the privacy settings for other users who may be incidentally captured in the local area surrounding the client device. The default privacy settings of the client device may prevent the client device from identifying those users who are incidentally captured.

Based on user's setting and authorization, the image capture device of the receiving client device captures video data or image data of a local area surrounding the receiving client device. In various embodiments, based on the user's authorization, the receiving client device applies one or more machine learned models to characteristics of the video captured by the image capture device to locate people included in the captured video data. In various embodiments, the controller applies one or more methods to locate people within the captured video data. The receiving client device may use any suitable model or combination of models to locate people within video data captured by the image capture device. The user may authorize the client device to apply models to captured video data to perform facial tracking (in two-dimensions or in three-dimensions), two-dimensional pose tracking, three-dimensional pose tracking, or any other suitable method to identify portions of a person's face or portions of the person's body.

Based on prior authorization from a sending user and from a receiving user, the receiving client device receives a request to exchange video data from the online system that includes information identifying the sending user associated with the request. In some embodiments, the request also includes content for presentation by the receiving client device, such as video, audio, or image data from a sending client device associated with the sending user. In various embodiments, the sending user transmits the request to the online system from a sending client device, and the online system transmits the request to the receiving client device.

The receiving client device determines whether the information identifying the sending user included in the received request matches obtained information identifying a user of the online system authorized to exchange video data with the receiving client device. If the obtained information identifying one or more users who are authorized to exchange video data with the receiving client device includes information identifying specific users of the online system, the receiving client device determines whether information identifying the sending user matches obtained information identifying the one or more users of the online system who are authorized to exchange video data with the receiving client device. If the obtained information identifying one or more users who are authorized to exchange video data with the receiving client device includes one or more rules each specifying one or more criteria, the receiving client device exchanges information with the online system, which determines whether characteristics of the sending user maintained by the online system satisfy at least a threshold amount of criteria included in a rule. In some embodiments, the receiving client device transmits the one or more rules and the information identifying the sending user from the received request to the online system, which retrieves characteristics of the sending user and determines whether the retrieved characteristics satisfy at least a threshold amount of criteria included in a rule. In response to the online system determining that that characteristics of the sending user maintained by the online system satisfy at least the threshold amount of criteria included in a rule, the online system transmits an indication that characteristics of the sending user satisfy at least the threshold amount of criteria included in a rule. However, in response to the online system determining that that characteristics of the sending user maintained by the online system do not satisfy at least the threshold amount of criteria included in at least one rule, the online system transmits an alternative indication that characteristics of the sending user satisfy at least the threshold amount of criteria included in at least one rule.

If the receiving client device determines the information identifying the sending user included in the received request matches obtained information identifying a user of the online system authorized to exchange video data with the receiving client device, the receiving client device establishes a connection with the online system for exchanging video data with the sending user without receiving an interaction from the receiving user. This allows the receiving client device to automatically establish a connection for exchanging video data, or other data, with certain sending users, identified by the obtained information, without receiving interaction from the receiving user. Hence, the users of the online system identified by the information obtained by the receiving client device may more readily exchange video data (or other suitable information) with the receiving client device by allowing the receiving client device to automatically establish a connection with the online system for the users identified by the obtained information and the receiving client device to exchange video data.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
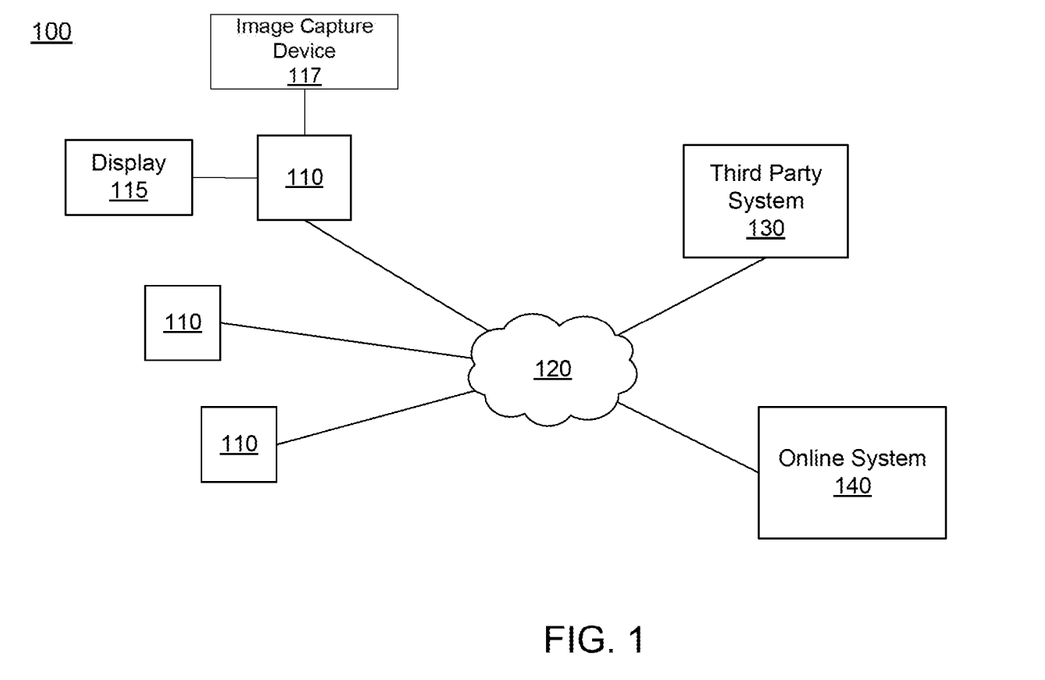
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. Additionally, in the system environment 100 shown by FIG. 1, a controller 117 is coupled to a client device 110. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. As further described below in conjunction with FIG. 2, a client device 110 includes a display device 115 configured to present content, and one or more image capture devices configured to capture image or video data of a local area surrounding the client device 110.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 3. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
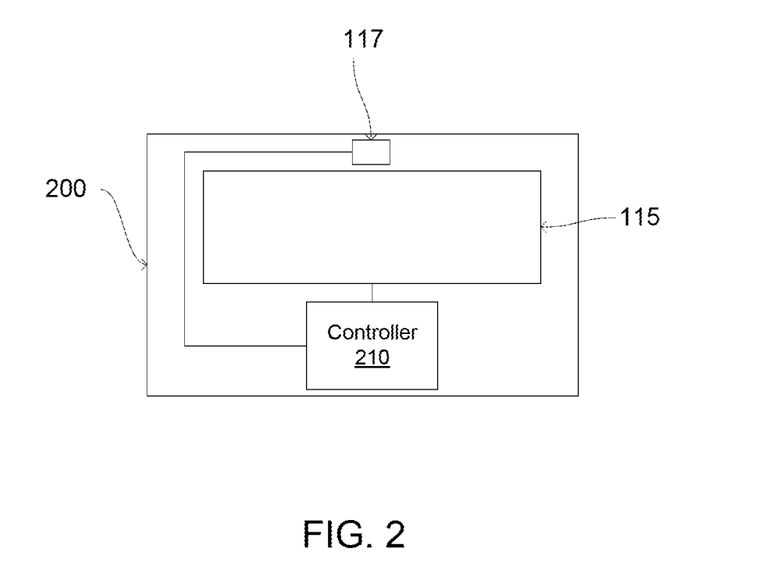
FIG. 2 is a block diagram of a client device, in accordance with an embodiment.

FIG. 2 is a block diagram of an embodiment of a client device 117. In the embodiment shown in FIG. 2, the client device 110 includes a display device 115 and an image capture device 117, as well as a controller 210. However, in other embodiments, the client device 110 includes different or additional components than those shown in FIG. 2.

The display device 115 may be integrated into the client device 110 or coupled to the client device 110. For example, a display device 115 integrated into a client device 110 is a display screen included in the client device 110. Alternatively, the display device 115 is a monitor or other display coupled to the client device 110. The display device 115 presents image data or video data to a user. Image or video data presented by the display device 115 is determined by an application executing on the client device 110. Different applications may be included on the client device 110, so execution of different applications changes the content presented by the user by the display device 115.

The image capture device 117 captures video data or images of a local area surrounding the client device 110 and within a field of view of the image capture device 117 based on user's setting and authorization. In some embodiments, the image capture device 117 includes one or more cameras, one or more video cameras, or any other device capable of capturing image data or video data. Additionally, the image capture device 117 may include one or more filters (e.g., used to increase signal to noise ratio). Various parameters (e.g., focal length, focus, frame rate, ISO, sensor temperature, shutter speed, aperture, focal point etc.) configure capture of video data or image data by the image capture device 117. Hence, modifying one or more parameters of the image capture device 117 modifies video data or image data captured by the image capture device 117 after modification of the one or more parameters. While FIG. 2 shows a single image capture device 117 included in the client device 110, in other embodiments, the client device 110 includes any suitable number of image capture devices 117.

The controller 210 is coupled to the image capture device 117 and comprises a storage device coupled to a processor. In various embodiments, the controller 210 is also coupled to the display device 115. Based on users' authorization, the controller 210 includes instructions that, when executed by the processor, apply one or more models to video data captured by the image capture device 117. As further described below in conjunction with FIG. 4, the controller 210 may include information identifying various users who are authorized to exchange video data, or other data, with the client device 110. If the client device 110 receives a request from the online system 140 that includes information identifying a sending user, the client device 110 determines whether the sending user is a user authorized to exchange video data or other data with the client device 110. As further described below in conjunction with FIG. 4, if the sending user is a user authorized to exchange video data or other data with the client device 110, the client device 110 establishes a connection with the online system 140 to exchange video data or other data with another client device 110 without first receiving an interaction from a user of the client device 110 to establish the connection.

In various embodiments, the client device 110 includes one or more audio capture devices, such as microphones. For example, the client device 110 includes an array of microphones configured for beamforming in two or three dimensions. The audio capture devices capture audio signals from different regions within a local area surrounding the client device 110. In various embodiments, the one or more audio capture devices are coupled to the controller 210, which maintains information identifying different regions of the local area surrounding the client device 110; for example, the controller 210 identifies 24 fifteen degree regions of the local area surrounding the client device 110 originating from a point within the client device 110, identifying regions of a 360 degree local area surrounding the client device 110.

The one or more audio capture devices are coupled to the controller 210, which applies one or more models, such as machine learned models or other sound recognition models, to audio data captured from a region of the local area surrounding the client device 110. The controller 210 includes information identifying users or objects (e.g., a television, a mobile device), and application of the one or more models to audio captured from a region of the local area surrounding the client device 110 determines whether the captured audio data includes audio data from a user or an object identified by the controller 210 or ambient noise. In some embodiments, the one or more models applied by the controller 210 determine a particular user or a particular object identified by the controller 210 from which the one or more audio capture devices captured audio in the region. In other embodiments, the client device 110 communicates audio data captured by one or more audio devices to the online system 140, which applies the one or more models to determine whether the audio data includes audio data captured from an identified object or user or to determine a particular identified user or object from which audio data was captured. The online system 140 provides the client device 110 with an indication of whether the captured audio data includes audio data captured from an identified object or user or provides information specifying a particular identified object or user from which the audio data was captured. The controller 210 or the online system 140 similarly determines whether audio captured from other regions surrounding the local area of the client device 110. Based on determinations of identified objects or users from which audio data in different regions was captured, the controller 210 modifies positioning of one or more audio devices to improve quality of audio captured from one or more regions. For example, the controller 210 repositions one or more audio capture devices to improve quality of audio captured from a region surrounding the local area from which audio data was captured from a specific user or from a specified object. Similarly, the controller 210 may reposition or otherwise modify one or more parameters of the image capture device 117 based on regions of the local area surrounding the client device 110 from which audio data was captured from different users or objects. The one or more audio devices and the image capture device 117 may be directed to different portions of the local area surrounding the client device 110 in various embodiments. For example, the image capture device 117 is directed to an object described by a user, while the controller 210 directs one or more audio capture devices to a region of the local area surrounding the client device 110 from which audio data was captured by a specific user.

The online system 140 and the client device 110 may cooperatively and/or individually maintain and enforce one or more privacy settings for users or for people identified from captured video data or other data in various embodiments. A privacy setting of a user or person determines how particular information associated with a user or person can be shared, and may be stored in association with information identifying the user or the person. In some embodiments, the controller 210 retrieves privacy settings for one or more users maintained by the online system 140. In one embodiment, a privacy setting specifies particular information associated with a user and identifies other entities with whom the specified information may be shared. Examples of entities with which information can be shared may include other users, applications, third party systems 130 or any entity that can potentially access the information. Examples of information that can be shared by a user include image data including the user or the person, audio data including audio captured from the user or the person, video data including the user or the person, and the like.

For example, in particular embodiments, privacy settings may allow a first user to specify (e.g., by opting out, by not opting in) whether the online system 140 may receive, collect, log, or store particular objects or information associated with the user for any purpose. In particular embodiments, privacy settings may allow the first user to specify whether particular video capture devices, audio capture devices, applications or processes may access, store, or use particular objects or information associated with the user. The privacy settings may allow the first user to opt in or opt out of having objects or information accessed, stored, or used by specific devices, applications or processes. The online system 140 may access such information in order to provide a particular function or service to the first user, without the online system 140 having access to that information for any other purposes. Before accessing, storing, or using such objects or information, the online system may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the online system 140.

The privacy settings maintained and enforced by the online system 140 and/or the controller 210 may be associated with default settings. In various embodiments, the controller 210 does not identify a user within captured video data, audio data, image data, or other data unless the controller 210 obtains a privacy setting from the user authorizing the controller 210 to identify the user. For example, a privacy setting associated with a user has a default setting preventing the controller 210 from identifying the user, so the controller 210 does not identify the user unless the user manually alters the privacy setting to allow the controller 210 to identify the user. Additionally, an alternative privacy setting regulates transmission of information from the client device 110 identifying the user to another entity (e.g., another client device 110, the online system 140, a third party system 130) in various embodiments. The alternative privacy setting has a default setting preventing transmission of information identifying the user in various embodiments, preventing the controller 210 from transmitting information identifying the user to other entities unless the user manually modifies the alternative privacy setting to authorize transmission). The controller 210 maintains the one or more privacy settings for each user identified from captured video data or other data, allowing user-specific control of transmission and identification of each user. In some embodiments, the controller 210 prompts a person to provide privacy settings when the controller 210 initially identifies the person from captured data and stores the provided privacy settings in association with information identifying the person.

In various embodiments, for the online system 140 and/or various components client device 110 that have functionalities that may use, as inputs, personal or biometric information of a user for user-authentication or experience-personalization purposes, a user may opt to make use of these functionalities to enhance their experience using the device and the online system. As an example and not by way of limitation, a user may voluntarily provide personal or biometric information to the online system 140. The user's privacy settings may specify that such information may be used only for particular processes, such as authentication, and further specify that such information may not be shared with any third-party or used for other processes or applications associated with the online system 140. As another example and not by way of limitation, the online system 140 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system or used by other processes or applications associated with the online system 140. As another example and not by way of limitation, the online system 140 may provide a functionality for a user to provide a reference image (e.g., a facial profile) to the online social network. The online social network may compare the reference image against a later-received image input (e.g., to authenticate the user, to tag the user in photos). The user's privacy setting may specify that such personal or biometric information may be used only for a limited purpose (e.g., authentication, tagging the user in photos), and further specify that such voice recording may not be shared with any third-party system or used by other processes or applications associated with the system 140. Any of such restrictions on capture biometric and/or other personal data may also be applied to the client device 110.

Users may authorize the capture of data, identification of users, and/or sharing and cross-application use of user-related data in one or more ways. For example, the client devices 110 may limit the storage of data captured by the client devices to local storage only unless users authorize the client device 110 to upload the data to the online system 140. Users may pre-select various privacy settings before the users use the features of the client devices 110 and/or take actions in the online system 140. In another case, a selection dialogue may be prompted when users first carry out an action or use a feature of the client devices 110 and/or the online system 140 and/or when users have not carried out the action or used the feature for a predetermined period of time. In yet another example, the client devices 110 and the online system 140 may also provide notifications to the users when certain features that require user data begin to operate or are disabled due to users' selections to allow users to make further selections through the notifications. Other suitable ways for users to make authorizations are also possible.

Figure 3:
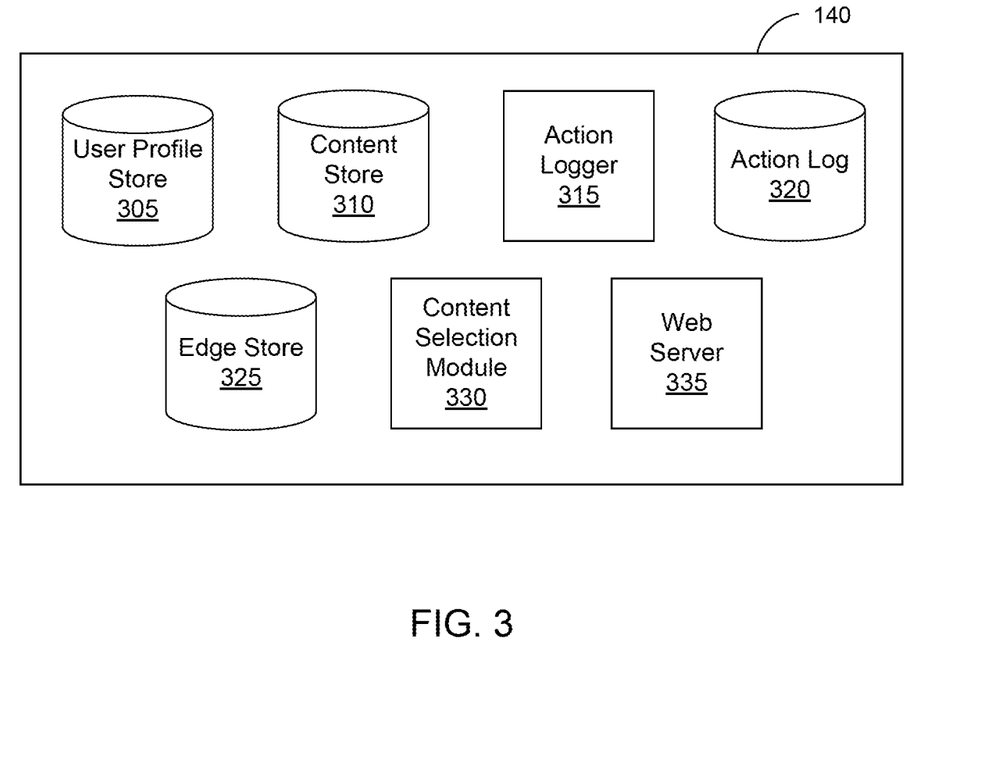
FIG. 3 is a block diagram of an online system, in accordance with an embodiment.

FIG. 3 is a block diagram of an architecture of the online system 140. The online system 140 shown in FIG. 3 includes a user profile store 305, a content store 310, an action logger 315, an action log 320, an edge store 325, a content selection module 330, and a web server 335. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 305. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 305 may also maintain references to actions by the corresponding user performed on content items in the content store 310 and stored in the action log 320.

Additionally, a user profile maintained for a user includes characteristics of one or more client devices 110 associated with the user, allowing the online system 140 to subsequently identify the user from characteristics provided by a client device 110. For example, an application associated with the online system 140 and executing on a client device 110 provides a device identifier or other information uniquely identifying the client device 110 to the online system 140 in association with a user identifier. The online system 110 stores the device identifier or other information uniquely identifying the client device 110 in the user profile maintained for the user, allowing subsequent identification of the user if the online system 140 receives the device identifier or other information uniquely identifying the client device 110. Other characteristics of client devices 110 associated with the user may be alternatively or additionally included in the user profile maintained by the user. For example, the user profile includes a network address used by a client device 110 to access a network 120, an identifier of an application executing on a client device 110 from which the online system 140 received information, a type of the client device 110 (e.g., a manufacturer, an identifier of a model of the client device 110, etc.) from which the online system 140 received information, and an operating system executing on the client device 110 from which the online system 140 received information. However, the online system 140 may store any suitable characteristics of a client device 110 in a user profile, allowing the online system 140 to maintain information about client devices 110 used by the user corresponding to the user profile.

In some embodiments, a user profile associated with a user includes information identifying one or more other users authorized to exchange information with a client device 110 associated with the user. For example, a user profile includes usernames, user identifiers, or other information uniquely identifying other users authorized to exchange video data with a client device associated with the user, allowing the user profile to individually identify other users who are authorized to exchange video data with the client device associated with the user. Additional information may be associated with information identifying a user authorized to exchange video data with the client device 110 associated with the user in various embodiments. For example, a time interval is associated with information identifying an additional user authorized to exchange video data with the client device 110 associated with the user to limit the additional user's authorization to exchange video data with the client device 110 associated with the user to the time interval. As another example, a connection with the user associated with the client device 110 via the online system 140 is associated with information identifying an additional user authorized to exchange video data with the receiving client device 110 to indicate the additional user is authorized to exchange video data with the client device 110 associated with the user while the user is connected to the additional user via the online system 140. In another example, an action is associated with information identifying an additional user authorized to exchange video data with the client device 110 associated with the user to indicate that the additional user is authorized to exchange video data with the client device 110 associated with the user if the online system 140 maintains information indicating the additional user has performed the action. However, any suitable criteria may be associated with information identifying an additional user authorized to exchange video data with a client device 110 associated with the user, limiting the additional user's authorization to exchange video data with the client device associated with the user unless characteristics associated with the additional user satisfy at least a threshold amount of the criteria.

Alternatively or additionally, information identifying one or more additional users of the online system 140 who are authorized to exchange video data with the client device 110 associated with the user comprises one or more rules, with each rule specifying one or more criteria. When at least a threshold amount of criteria specified by a rule are satisfied by characteristics of an additional user of the online system 140 maintained by the online system 140, the additional user is authorized to exchange video data with the client device 110 associated with the user. This allows additional users of the online system 140 having particular characteristics to be authorized to exchange video data with the client device 110 associated with the user. Example criteria specified by a rule include: a connection to the user maintained by the online system 140, a connection to an object maintained by the online system 140, an action stored by the online system 140 in association with the additional user authorized to exchange video data with the client device 110 associated with the user, and a connection to a specific user of the online system 140. However, any suitable criteria may be specified by one or more rules to identify additional users who are authorized to exchange video data with the client device 110 associated with the user.

While user profiles in the user profile store 305 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 310 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 310, such as status updates, photos tagged by users to be associated with other objects in the online system 140, events, groups or applications. In some embodiments, objects are received from third-party applications or third-party applications separate from the online system 140. In one embodiment, objects in the content store 310 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 310 include a creative, which is content for presentation to a user, and a bid amount. The creative is text, image, audio, video, or any other suitable data presented to a user. In various embodiments, the creative also specifies a page of content. For example, a content item includes a link that specifying a network address of a landing page of content to which a user is directed when the content item is accessed. If a user presented with the content The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

Based on users' privacy settings, the action logger 315 may be authorized to receive communications about user actions internal to and/or external to the online system 140, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 320.

Based on the privacy settings, the action log 320 may be authorized by the users to be used by the online system 140 to track user actions on the online system 140, as well as actions on third party systems 130 that communicate information to the online system 140. Users may interact with various objects on the online system 140, and information describing these interactions is stored in the action log 320. Examples of interactions with objects include: commenting on posts, sharing links, checking-in to physical locations via a client device 110, accessing content items, and any other suitable interactions. Additional examples of interactions with objects on the online system 140 that are included in the action log 320 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 320 may record a user's interactions with advertisements on the online system 140 as well as with other applications operating on the online system 140. In some embodiments, data from the action log 320 is used to infer interests or preferences of a user, augmenting the interests included in the user's user profile and allowing a more complete understanding of user preferences.

The action log 320 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 320 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 315 by the application for recordation and association with the user in the action log 320.

In one embodiment, the edge store 325 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

The content selection module 330 selects one or more content items for communication to a client device 110 to be presented to a user. Content items eligible for presentation to the user are retrieved from the content store 310 or from another source by the content selection module 330, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 330 includes content items eligible for presentation to the user in one or more selection processes, which identify a set of content items for presentation to the user. For example, the content selection module 330 determines measures of relevance of various content items to the user based on attributes associated with the user by the online system 140 and based on the user's affinity for different content items. A measure of relevance of a content item to the user is based on a measure of quality of the content item for the user, which may be based on the creative included in the content item as well as content of a landing page identified by a link in the content item. Based on the measures of relevance, the content selection module 330 selects content items for presentation to the user. As an additional example, the content selection module 330 selects content items having the highest measures of relevance or having at least a threshold measure of relevance for presentation to the user. Alternatively, the content selection module 330 ranks content items based on their associated measures of relevance and selects content items having the highest positions in the ranking or having at least a threshold position in the ranking for presentation to the user.

Content items eligible for presentation to the user may include content items associated with bid amounts. The content selection module 330 uses the bid amounts associated with content items when selecting content for presentation to the user. In various embodiments, the content selection module 330 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 330 may rank content items based on their associated bid amounts and select content items having at least a threshold position in the ranking for presentation to the user. In some embodiments, the content selection module 330 ranks both content items not associated with bid amounts and content items associated with bid amounts in a unified ranking based on bid amounts and measures of relevance associated with content items. Based on the unified ranking, the content selection module 330 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 330 receives a request to present a feed of content to a user of the online system 140. The feed includes content items such as stories describing actions associated with other online system users connected to the user. The content selection module 330 accesses one or more of the user profile store 305, the content store 310, the action log 320, and the edge store 325 to retrieve information about the user. For example, information describing actions associated with other users connected to the user or other data associated with users connected to the user are retrieved. Content items from the content store 310 are retrieved and analyzed by the content selection module 330 to identify candidate content items eligible for presentation to the user. For example, content items associated with users who not connected to the user or stories associated with users for whom the user has less than a threshold affinity are discarded as candidate content items. Based on various criteria, the content selection module 330 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 330 presents content to a user through a feed including a plurality of content items selected for presentation to the user. The content selection module 330 may also determine the order in which selected content items are presented via the feed. For example, the content selection module 330 orders content items in the feed based on likelihoods of the user interacting with various content items.

The content selection module 330 receives video data captured by an image capture device 117 included in a client device 110 associated with a sending user of the online system and transmits the video data to a receiving client device 110 for presentation to a receiving user via a display device 115. The content selection module may receive a request from the client device 110 that identifies the receiving user, and subsequently transmits a request to the receiving client device 110 to establish a connection with the online system 140 for receiving data from the sending client device 110. As further described below in conjunction with FIG. 4, the online system 140 may include information in a user profile associated with the receiving user that authorizes the sending user to exchange video data with a client device 110 associated with the receiving user. As further described below in conjunction with FIG. 4, if the sending user is authorized to exchange video data with the receiving client device 110, the receiving client device 110 automatically establishes a connection with the online system 140 for exchanging video data upon receiving the request identifying the sending user from the online system 140.

The content selection module 330 enforces one or more privacy settings of the users of the online system 140 in various embodiments. A privacy setting of a user determines how particular information associated with a user can be shared, and may be stored in the user profile of a user in the user profile store 305. In one embodiment, a privacy setting specifies particular information associated with a user and identifies other entities with whom the specified information may be shared. Examples of entities with which information can be shared may include other users, applications, third party systems 130 or any entity that can potentially access the information. Examples of information that can be shared by a user include user profile information like profile photo, phone numbers associated with the user, user's connections, video data including the user, actions taken by the user such as adding a connection, changing user profile information and the like. In various embodiments, the online system 140 maintains privacy settings associated with a user having a default setting preventing other entities from accessing or receiving content associated with the user, and allows the user to modify different privacy settings to allow other entities that are specified by the user to access or to retrieve content corresponding to the modified privacy settings.

The privacy setting specification may be provided at different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. Specification of the set of entities that can access particular information may also be specified at various levels of granularity. Various sets of entities with which information can be shared may include, for example, all users connected to the user, a set of users connected to the user, additional users connected to users connected to the user all applications, all third party systems 130, specific third party systems 130, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The content selection module 330 includes logic to determine if certain information associated with a user can be accessed by other users connected to the user via the online system 140, third-party system 130 and/or other applications and entities. Based on the user's privacy settings, the content selection module 330 determines if another user, a third-party system 130, an application or another entity is allowed to access information associated with the user, including information about actions taken by the user. For example, the content section module 230 uses a user's privacy setting to determine if video data including the user may be presented to another user. This enables a user's privacy setting to specify which other users, or other entities, are allowed to receive data about the user's actions or other data associated with the user.

The web server 335 links the online system 140 via the network 120 to the one or more client devices 110, as well as to the one or more third party systems 130. The web server 335 serves web pages, as well as other content, such as JAVA®, FLASH®, XML and so forth. The web server 335 may receive and route messages between the online system 140 and the client device 110, for example, instant messages, queued messages (e.g., email), text messages, short message service (SMS) messages, or messages sent using any other suitable messaging technique. A user may send a request to the web server 335 to upload information (e.g., images or videos) that are stored in the content store 310. Additionally, the web server 335 may provide application programming interface (API) functionality to send data directly to native client device operating systems, such as IOS®, ANDROID™, or BlackberryOS.

Exchanging Video Data Between Client Devices Associated with Identified Users

Figure 4:
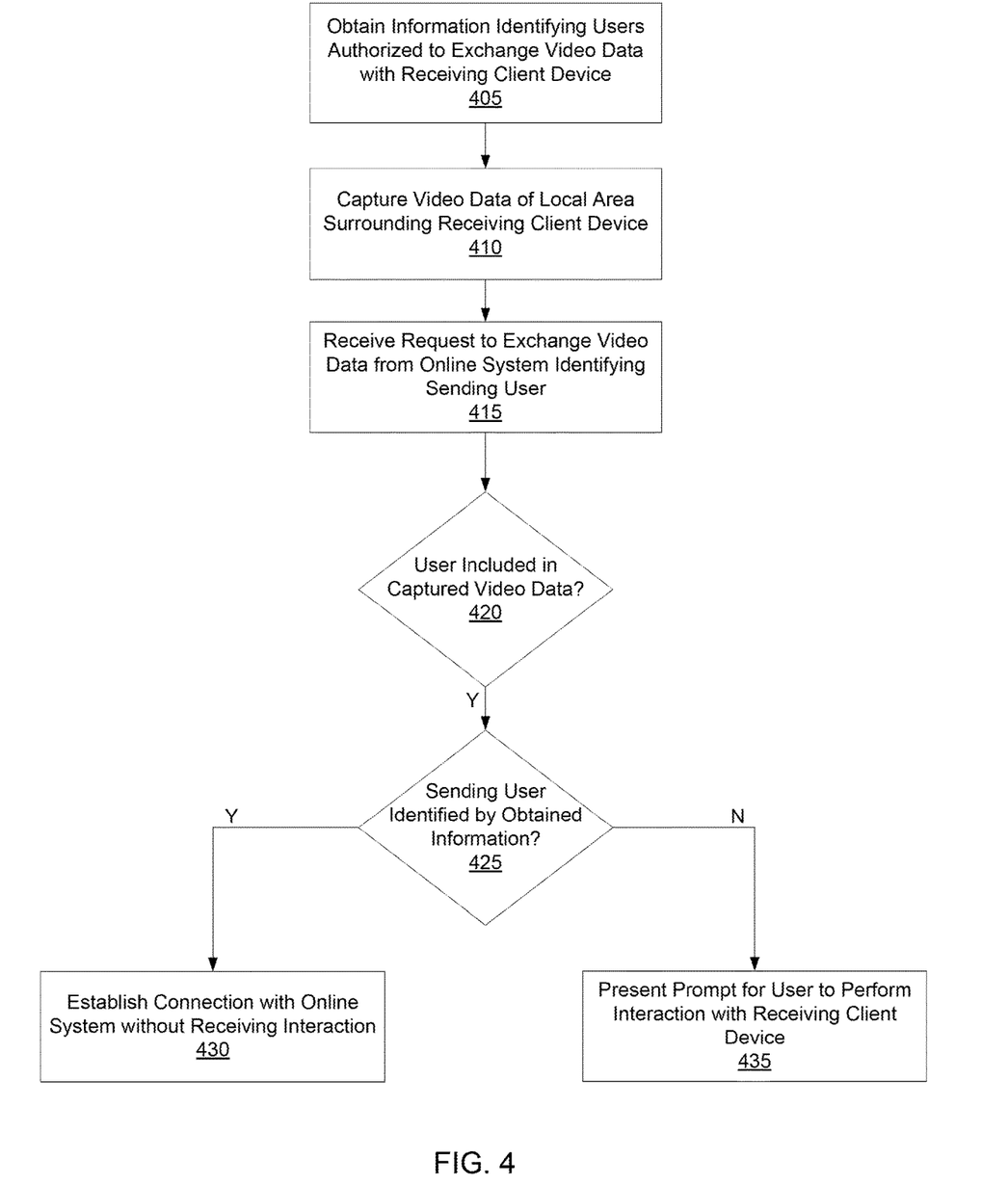
FIG. 4 is a flowchart of a method for exchanging content between a receiving client device and a client device associated with a user identified by the receiving client device, in accordance with an embodiment.

FIG. 4 is a flowchart of one embodiment of a method for exchanging content between a receiving client device 110 and a client device 110 associated with a user identified by the receiving client device 110. In various embodiments, the steps described in conjunction with FIG. 4 may be performed in different orders. Additionally, in some embodiments, the method may include different and/or additional steps than those shown in FIG. 4.

A receiving client device 110 includes an image capture device 117, as further described above in conjunction with FIGS. 1 and 2. Additionally, the receiving client device 110 obtains 405 information identifying one or more users of an online system 140 who are authorized to exchange video data with the receiving client device 110. In various embodiments, a receiving user associated with the receiving client device 110 provides information identifying the one or more users authorized to exchange video data with the receiving client device 110 to the receiving client device 110, which locally stores the information identifying the one or more users authorized to exchange video data with the receiving client device 110. Alternatively, the receiving user provides information identifying the one or more users authorized to exchange video data with the receiving client device 110 to the online system 140, which stores the information identifying the one or more users authorized to exchange video data with the receiving client device 110 in association with the receiving user. For example, the online system 140 stores the information identifying the one or more users authorized to exchange video data with the receiving client device 110 in a user profile maintained for the receiving user. The receiving client device 110 retrieves the information identifying the one or more users authorized to exchange video data with the receiving client device 110 in various embodiments. In some embodiments, the receiving client device 110 periodically retrieves the information identifying the one or more users authorized to exchange video data with the receiving client device 110 and subsequently stores the retrieved information.

In various embodiments, different information identifying the one or more users authorized to exchange video data with the receiving client device 110 is obtained 405 by the receiving client device 110. For example, a username, an email address, a user identifier, or other information uniquely identifying a user authorized to exchange video data with the receiving client device 110 is obtained 405 by the receiving client device 110, allowing individual users who are authorized to exchange video data with the receiving client device 110 to be identified. Additional information may be associated with information identifying a user authorized to exchange video data with the receiving client device 110 in various embodiments. For example, a time interval is associated with information identifying a user authorized to exchange video data with the receiving client device 110 to indicate that the user is authorized to exchange video data with the receiving client device 110 during the time interval, but not during times other than the time interval. As another example, a connection with the receiving user via the online system 140 is associated with information identifying a user authorized to exchange video data with the receiving client device 110 to indicate that the user is authorized to exchange video data with the receiving client device 110 while the user is connected to the receiving user via the online system 140. In another example, an action is associated with information identifying a user authorized to exchange video data with the receiving client device 110 to indicate that the user is authorized to exchange video data with the receiving client device 110 if the online system 140 maintains information indicating the user has performed the action. However, any suitable criteria may be associated with information identifying a user authorized to exchange video data with the receiving client device 110, limiting the user's authorization to exchange video data with the receiving client device unless characteristics associated with the user satisfy at least a threshold amount of the criteria.

Alternatively or additionally, information identifying one or more users of the online system 140 who are authorized to exchange video data with the receiving client device 110 comprises one or more rules, with each rule specifying one or more criteria. When at least a threshold amount of criteria specified by a rule are satisfied by characteristics of a user of the online system 140 maintained by the online system 140, the user is authorized to exchange video data with the receiving client device 110. This allows users of the online system 140 having particular characteristics to be authorized to exchange video data with the receiving client device 110. Example criteria specified by a rule include: a connection to the receiving user maintained by the online system 140, a connection to an object maintained by the online system 140, an action stored by the online system 140 in association with the user authorized to exchange video data with the receiving client device 110, and a connection to a specific user of the online system 140. Criteria specified by a rule may also include information obtained from one or more third party systems 130. However, any suitable criteria may be specified by one or more rules to identify users who are authorized to exchange video data with the receiving client device 110. Additionally, criteria specified by a rule include information identifying a user and information maintained by the online system 140 in association with the receiving user associated with the receiving client device 110 or other information. For example, a rule identifies a user and an event associated with the receiving user by the online system 140, so the identified user is authorized to exchange video data with the receiving client device 110 during the event. As another example, a rule identifies a user and an appointment maintained by the online system 140 to authorize the user to exchange video data with the receiving client device 110 during the appointment, but not at other times. Any suitable information maintained by the online system 140 or by a third party system 130 may be included in criteria of a rule, allowing the receiving user to leverage information maintained by the online system 140 or by the third party system 130 to identify users who are authorized to exchange video data with the receiving client device 110 or restrictions on when users are authorized to exchange video data with the receiving client device 110.

Based on user's authorization, the image capture device 117 of the receiving client device 110 captures 410 video data or image data of a local area surrounding the receiving client device 110. Images captured by the image capture device 117 are communicated to a controller 210 included in the receiving client device 110 (or coupled to the receiving client device 110 in other embodiments). In various embodiments, based on user's authorization specified in one or the privacy settings maintained by the client device 110 or the online system 140, the controller 210 applies one or more machine learned models to characteristics of the video captured 410 by the image capture device 117 to locate people included in the captured video data. Similarly, the controller 210 receives audio data captured from the local area surrounding the receiving client device 110 and applies one or more models, as further described above in conjunction with FIG. 2, to locate people included in the captured audio data. In various embodiments, the controller 210 applies one or more methods to locate people within the captured video data. The controller 210 may use any suitable model or combination of models to locate people within video data captured 410 by the image capture device 117. Models applied by the controller 210 to captured video data may perform facial tracking (in two-dimensions or in three-dimensions), two-dimensional pose tracking, three-dimensional pose tracking, or any other suitable method to identify portions of a person's face or portions of the person's body. Models applied by the controller 210 may also identify one or more people within the local area surrounding the receiving client device 110 based on audio data captured by the receiving client device 110, image data captured by the receiving client device 110, or other suitable data captured by the receiving client device 110. Hence, the controller 210 may use any suitable data or combination of data captured by the receiving client device 110 to identify people within the local area surrounding the receiving client device 110.

The receiving client device 110 receives 415 a request to exchange video data from the online system 140 that includes information identifying a sending user associated with the request. For example, the request includes an identifier associated with the sending user by the online system 140, such as a username, an email address, a user identifier, or other suitable information. In some embodiments, the request also includes content for presentation by the receiving client device 110, such as video, audio, or image data from a sending client device 110 associated with the sending user. In various embodiments, the sending user transmits the request to the online system 140 from a sending client device 110, and the online system transmits the request to the receiving client device 110.

From the captured video data, captured audio data, captured image data, or other captured data, the receiving client device 110 determines 420 whether a user of the online system 140 is within the local area surrounding the receiving client device 110 or is included in video data captured by the receiving client device 110. In one embodiment, the receiving client device 110 determines the user by using data locally stored in the client device. For example, the receiving client device 110, based on user's authorization, captures images and/or voices of users and save the captured data locally in its memory.

In some embodiments, users may authorize the exchange of data and resources between the receiving client device 110 and the online system 140 to enhance the user's experience in the client device 110. For example, based on the user's authorization, the receiving client device 110 transmits the captured video data or captured audio data to the online system 140, which includes information identifying various users, as further described above. The online system 140 determines measures of similarity between people identified in the captured video data or identified in the captured audio data to information identifying various users using any suitable method or methods. If the online system 140 determines a person identified in the captured video data has at least a threshold measure of similarity to information identifying a user of the online system 140, the online system 140 provides an indication to the receiving client device 110 that the captured video data includes a user of the online system 140. Similarly, if the online system 140 determines a person identified in captured image data or captured audio data has at least a threshold measure of similarity to information identifying a user of the online system 140, the online system 140 provides an indication to the receiving client device 110 that the captured image data or audio data includes a user of the online system 140.

In some embodiments, the receiving client device 110 determines whether a user of the online system 140 included in the captured video data, in the captured audio data, or in other captured data is the receiving user associated with the receiving client device 110. In some embodiments, the receiving user authorizes the receiving client device 110 to locally store information identifying the receiving user and compares people identified in the captured video data to the information identifying the receiving user. For example, the receiving client device 110 stores images of the receiving user's face and compares faces of people located within the captured video data to the images of the receiving user's face. Upon users' consent, the receiving client device 110 may use one or more facial recognition processes to determine measures of similarity between stored images of the receiving user's face and faces of people located within the captured video data; if a face of a person located within the captured video data has at least a threshold measure of similarity to the images of the receiving user's face, the receiving client device 110 determines the receiving user is included in the captured video data. The receiving client device 110 may similarly use any suitable audio or image recognition processes to determine measures of similarity between stored audio data or image data identifying the receiving user and people included in image data or audio data captured by the receiving client device 110.

In other embodiments, after the user's authorization to share data, the receiving client device 110 transmits the captured video data or other captured data (e.g., audio data, image data) to the online system 140, which includes information identifying the receiving user, as further described above. The online system 140 compares people identified in the captured video data or other captured data to the information identifying the receiving user and determines measures of similarity between people located in the captured video data or other data to the information identifying the receiving user using any suitable method. The online system 140 determines the receiving user is included in the captured video data or in the other captured data in response to a person located in the captured video data or identified within the other captured data having at least a threshold measure of similarity to the information identifying the receiving user. If the online system 140 determines the receiving user is included in the captured video data or in the other captured data, the online system 140 transmits an indication of the determination (e.g., a control signal having a value if the receiving user is determined 415 to be included in the captured video data or included in the other captured video data and having an alternative value if the receiving user is determined 415 not to be included in the captured video data or other captured data).

The receiving client device 110 or the online system 140 may use any suitable authorized information identifying the receiving user to determine whether the captured video data or other captured data includes the receiving user. For example, when the receiving user authorizes the receiving client device 110 to store images of the user's face, the receiving client device 110 or the online system 140 compare faces of people located in in the captured video data to stored images of the receiving user's face using any suitable facial recognition method and determines the captured video data includes the receiving user in response to a face of a person located in the captured video data having at least a threshold measure of similarity to a stored image of the receiving user's face. As another example, upon user's authorization, the receiving client device 110 captures audio data from a person in the local area of the receiving client device 110 but outside the field of view of the image capture device 117 of the receiving client device 110, and the captured audio data is compared to stored audio data identifying the receiving user (e.g., a recording of the receiving user's voice) by the receiving client device 110 or by the online system 140 using any suitable method; if the captured audio data has at least a threshold measure of similarity to the stored audio data identifying the receiving user, the receiving client device 110 or the online system 140 determines the receiving client device 110 is included in data captured by the client device 110. The receiving client device 110 or the online system 140 determines the receiving user is included in the captured video data in response to the captured audio data having at least a threshold measure of similarity to the stored audio data identifying the receiving user. In another example, the online system 140 or the receiving client device 110 extracts a color map from previously captured video data including the receiving user and associates the extracted color map with the receiving user; subsequently, the online system 140 or the receiving client device 110 extracts an additional color map from the captured video data. If the online system 140 or the receiving client device 110 determines the additional color map has at least a threshold measure of similarity with the color map associated with the receiving user, the online system 140 or the receiving client device 110 determines the captured video data includes the receiving user. In various embodiments, the previously captured video data from which the color map is extracted may be video data captured within a threshold time interval of a time when the receiving client device 110 received 410 the request (e.g., within 2 hours of when the receiving client device 110 received 410 the request). In various embodiments, the online system 140 stores information identifying a check-in by the receiving user from a location corresponding to the receiving client device 110 in response to determining the receiving user is within video data or other data captured by the receiving client device 110 or in response to receiving a determination that video data captured by the receiving client device 110 or audio data captured by the receiving client device 110 includes the receiving user. The check-in is stored as an action in association with the receiving user by the online system 140, as described above in conjunction with FIG. 3.

If the receiving client device 110 determines 420 a user of the online system 140 is not included in the captured video data, or determines a user included in the captured video data is not the receiving user, the client device 110 does not perform additional actions.

After determining 420 a user of the online system 140 is included in the captured video data or in other captured data, or determining the receiving user is included in the captured video data or other captured data, the receiving client device 110 determines 425 whether the information identifying the sending user included in the received request matches obtained information identifying a user of the online system 140 authorized to exchange video data with the receiving client device 110. If the obtained information identifying one or more users who are authorized to exchange video data with the receiving client device 110 includes information identifying specific users of the online system 140, the receiving client device 110 determines 425 whether information identifying the sending user matches obtained information identifying the one or more users of the online system 140 who are authorized to exchange video data with the receiving client device 110. If the obtained information identifying one or more users who are authorized to exchange video data with the receiving client device 110 includes one or more rules each specifying one or more criteria, the receiving client device 110 exchanges information with the online system 140, which determines whether characteristics of the sending user maintained by the online system 140 satisfy at least a threshold amount of criteria included in a rule. In some embodiments, the receiving client device 110 transmits the one or more rules and the information identifying the sending user from the received request to the online system 140, which retrieves characteristics of the sending user and determines whether the retrieved characteristics satisfy at least a threshold amount of criteria included in a rule. In response to the online system 140 determining that that characteristics of the sending user maintained by the online system 140 satisfy at least the threshold amount of criteria included in a rule, the online system 140 transmits an indication that characteristics of the sending user satisfy at least the threshold amount of criteria included in a rule. However, in response to the online system 140 determining that that characteristics of the sending user maintained by the online system 140 do not satisfy at least the threshold amount of criteria included in at least one rule, the online system 140 transmits an alternative indication that characteristics of the sending user satisfy at least the threshold amount of criteria included in at least one rule.

If the receiving client device 110 determines 425 the information identifying the sending user included in the received request matches obtained information identifying a user of the online system 140 authorized to exchange video data with the receiving client device 110, the receiving client device 110 establishes 430 a connection with the online system 140 for exchanging video data with the sending user without receiving an interaction from the receiving user. This allows the receiving client device 110 to automatically establish a connection for exchanging video data, or other data, with certain sending users, identified by the obtained information, without receiving interaction from the receiving user. Hence, the users of the online system 140 identified by the information obtained 405 by the receiving client device 110 may more readily exchange video data (or other suitable information) with the receiving client device 110 by allowing the receiving client device 110 to automatically establish a connection with the online system 140 for the users identified by the obtained information and the receiving client device 110 to exchange video data.

If the receiving client device 110 receives multiple requests that each identify a different sending user, the receiving client device 110 determines a measure of relevance for each received request and selects a received request based on the measures of relevance. In various embodiments, a measure of relevance for a received request is based on prior interactions between the receiving user and a sending user identified by the received request; for example, a measure of relevance for a received request is based on one or more of: durations of prior exchanges of data between the receiving user and the sending user identified by the received request, a number of exchanges of data between the receiving user and the sending user identified by the received request within a specific time interval, types of data exchanged between the receiving user and the sending user identified by the received request within the specific time interval, and any combination thereof. Additionally, if users authorize the exchange of data between the receiving client device 110 and the online system 140, the receiving client device 110 may account for information maintained by the online system 140 when determining a measure of relevance for a received request. For example, the receiving client device 110 determines the measure of similarity for a received request based on a type of connection between the receiving user and the sending user identified by the received request maintained by the online system 140, actions between the receiving user and the sending user identified by the received request maintained by the online system 140, connections between the receiving user and other users or objects maintained by the online system as well as connections between the sending user identified by the received request and other users or object maintained by the online system 140, or any other suitable information maintained by the online system 140. In various embodiments, the receiving client device 110 selects a received request having a maximum measure of relevance or having at least a threshold measure of relevance. Alternatively, the receiving client device 110 ranks received requests based on their measures of relevance and selects a received request having a maximum position in the ranking or at least a threshold position in the ranking. Subsequently, the receiving client device 110 determines 425 whether the information identifying the sending user included in the selected received request matches obtained information identifying a user of the online system 140 authorized to exchange video data with the receiving client device 110, as further described above.

If the receiving client device 110 determines 425 the information identifying the sending user included in the received request does not match obtained information identifying a user of the online system 140 authorized to exchange video data with the receiving client device 110, the receiving client device 110, the receiving client device 110 presents 435 a prompt to the receiving user via a display device 115. The prompt requests the receiving user to perform an interaction with the receiving client device 110 to establish a connection between the receiving client device 110 and the online system 140. In response to receiving the interaction from the receiving user, the receiving client device 110 establishes 430 the connection with the online system 140, a further described above. In various embodiments, the prompt identifies the sending user in addition to requesting the receiving user perform an interaction with the receiving client device. In embodiments where the online system 140 determines whether characteristics of the sending user satisfy at least a threshold amount of criteria specified by one or more rules identifying users who are authorized to exchange video data with the receiving client device 110, the receiving client device 110 receives the alternative indication that characteristics of the sending user satisfy at least the threshold amount of criteria included in at least one rule from the online system 140 and presents 435 the prompt to the user in response to receiving the alternative indication.

In various embodiments, a sending client device 110 associated with the sending user includes an image capture device 117 configured to capture image data or video data of a local area surrounding the sending client device 110 based on the sending user's setting and authorization. The sending client device 110 transmits the captured video data or image data to the online system 140, which transmits the video data or the image data to the receiving client device 110 via the established channel. Similarly, the receiving client device 110 transmits video data or image data captured by the image capture device 117 of the receiving client device 110 to the online system 140 via the established channel, which transmits the video data or image date from the receiving client device 110 to the sending client device 110. In other embodiments, the receiving client device 110 and the sending client device 110, respectively, may provide any suitable content to the online system 140 for transmission to the sending client device 110 or to the receiving client device 110, respectively. This allows the online system 140 to automatically establish connections with the sending client device 110 and with the receiving client device 110 that allow the sending client device 110 and the receiving client device 110 to exchange data without the sending client device 110 receiving an interaction from the sending user and without the receiving client device 110 receiving an interaction from the receiving user.

In some embodiments, the online system 140 receives an indication the receiving user is included in video data or image data captured by the image capture device 117 of the receiving client device 110 that includes information identifying the receiving user or determines the receiving user is in image data or video data received from the image capture device 117 of the receiving client device. Similarly, the online system 140 receives an additional indication the sending user is included in video data or image data captured by the image capture device 117 of the sending client device 110 that includes information identifying the sending user or determines the sending user is included in video data or image data captured by the image capture device 117 of the sending client device 110. Based on user privacy settings, the online system 140 also maintains information identifying users who are authorized to exchange video data with the receiving client device 110 in association with the receiving user, while maintaining information identifying users who are authorized to exchange video data with the sending client device 110 in association with the sending user. If the online system 140 determines that the receiving user is a user who is authorized to exchange video data with the sending client device 110 from the information associated with the sending user and determines that the sending user is a user who is authorized to exchange video data with the receiving client device 110 from the information associated with the receiving user after determining image data or video data captured by the image capture device 117 of the receiving client device 110 includes the receiving user and determining image data or video data captured by the image capture device 117 of the sending client device 110 includes the sending user, the online system 140 establishes a connection with the sending client device 110 and with the receiving client device 110. The online system 140 also transmits a notification of the established channel to the sending client device 110 and to the receiving client device 110 so the sending client device 110 and the receiving client device 110 exchange video data or other data with each other via the established channels and the online system 140. This allows the sending client device 110 and the receiving client device 110 to initiate exchange of data without receiving interaction from the sending user or from the receiving user, respectively, based on the online system 140 determining video data or image data captured by the sending client device 110 includes a user authorized by the receiving client device 110 to exchange video data and determining video data or image data captured by the receiving client device 110 includes a user authorized by the sending client device 110 to exchange video data. If the online system 140 receives information from multiple receiving client devices 110 that a receiving user is included in video data or image date captured by each of the receiving client devices 110 and includes information identifying the sending user as authorized to exchange video data with two or more of the multiple receiving client devices 110, the online system 140 determines measures of relevance of different receiving users of the multiple receiving client devices 110. As further described above, a measure of relevance of a receiving user to the sending user may be based on information maintained by the online system 140 subject to users' privacy settings (e.g., connection between the sending user and the receiving user, connections between the sending user and other objects, connections between the receiving user and other objects, actions associated with the sending user, actions associated with the receiving user, and any other suitable information). The online system 140 selects a receiving user based on the measures of relevance (e.g., having a threshold measure of relevance, having a threshold position in a ranking based on measures of relevance) and establishes a connection with the receiving client device 110 of the selected receiving user and a connection with the sending client device 110.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    storing, at an online system, a plurality of profiles for a plurality of users of the online system, each of the plurality of profiles including declarative information about a user associated with the profile and user identifiers of one or more other users of the online system authorized to exchange video data with a receiving client device of the user associated with the profile;
    transmitting, from the online system to the receiving client device, a request from a sending client device of a sending user to exchange first video data captured by an image capture device of the sending client device with the receiving client device, the request including information identifying the sending user associated with the first video data;
    receiving, at the online system, an indication that a receiving user is included in second video data captured by an image capture device included in the receiving client device;
    receiving, at the online system, an indication that the sending user is included in the first video data captured by the image capture device included in the sending client device of the sending user;
    determining, by the online system, that the sending user is authorized to exchange the first video data with the receiving user responsive to a profile of the receiving user including a user identifier of the sending user;
    determining, by the online system, that the receiving user is authorized to exchange the second video data with the sending user responsive to a profile of the sending user including a user identifier of the receiving user;
    automatically establishing a connection between the online system, the receiving client device, and the sending client device for exchanging the first video data and the second video data without the receiving client device receiving an interaction from the receiving user requesting to establish the connection responsive to:
        (1) the online system determining that the sending user is authorized to exchange the first video data with the receiving user,
        (2) the online system determining that the receiving user is authorized to exchange the second video data with the sending user,
        (3) the online system receiving the indication that the receiving user is included in the second video data, and
        (4) the online system receiving the indication that the sending user is included in the first video data.

2. The method of claim 1, wherein the indication that the receiving user is included in the second video data is received responsive to a determination at the receiving client device that the receiving user is included in the second video data using information maintained by the receiving client device.

3. The method of claim 2, further comprising:
    establishing the connection between the online system, the sending client device, and the receiving client device responsive to the receiving client device interacting with a prompt approving the establishment of the connection, the prompt presented to the receiving client device responsive to an identified user in the second video data not being the receiving user according to the information maintained by the receiving client device.

4. The method of claim 1, wherein at least one of the plurality of profiles further includes a time interval associated with when the one or more other users identified in the profile are authorized to exchange video data with the receiving client device.

5. The method of claim 4, wherein automatically establishing the connection is further responsive to:
    (5) determining the request was received at a time within the time interval.

6. The method of claim 5, further comprising:
    establishing the connection between the online system, the sending client device, and the receiving client device responsive to the receiving client device interacting with a prompt that approves the establishment of the connection, the prompt presented to the receiving client device responsive to the time when the request was received is not within the time interval.

7. The method of claim 1, further comprising:
    storing one or more rules for application to characteristics of the one or more users of the online system, a rule specifying one or more criteria that, when at least a threshold amount of the one or more criteria are satisfied by one or more characteristics of the user of the online system, authorize the user to exchange video data with the receiving client device.

8. The method of claim 7, wherein a rule specifies one or more selected from a group consisting of: a connection to the receiving user maintained by the online system, a connection to an object maintained by the online system, an action stored by the online system in association with the user authorized to exchange video data with the receiving client device, and any combination thereof.

9. The method of claim 7, wherein automatically establishing the connection is further responsive to:

determining, by the online system, that characteristics of the sending user maintained by the online system satisfy at least the threshold amount of the one or more criteria specified by a rule.

10. The method of claim 8, further comprising:
determining, by the online system, that characteristics of the sending user maintained by the online system satisfy do not satisfy at least the threshold amount of the one or more criteria specified by at least one rule; and
transmitting from the online system to the receiving client device an indication to present a prompt to the receiving user identifying the sending user and for the receiving user to perform the interaction with the receiving client device in response to determining that characteristics of the sending user maintained by the online system satisfy do not satisfy at least the threshold amount of the one or more criteria specified by at least one rule.

11. A computer program product comprising a non-transitory computer readable storage medium having instructions encoded thereon that, when executed by a processor, cause the processor to:
storing, at an online system, a plurality of profiles for a plurality of users of the online system, each of the plurality of profiles including declarative information about a user associated with the profile and user identifiers of one or more other users of the online system authorized to exchange video data with a receiving client device of the user associated with the profile;
transmit, from the online system to the receiving client device, a request from a sending device of a sending user to exchange first video data captured by an image capture device of the sending device with the receiving client device, the request including information identifying the sending user associated with the first video data;
receive, at the online system, an indication that a receiving user is included in second video data captured by an image capture device included in the receiving client device;
receive at the online system, an indication that the sending user is included in the first video data captured by the image capture device included in the sending client device of the sending user;
determining, by the online system, that the sending user is authorized to exchange the first video data with the receiving user responsive to a profile of the receiving user including a user identifier of the sending user;
determining, by the online system, that the receiving user is authorized to exchange the second video data with the sending user responsive to a profile of the sending user including a user identifier of the receiving user;
automatically establishing a connection between the online system, the receiving client device, and the sending client device for exchanging the first video data and the second video data without the receiving client device receiving an interaction from the receiving user requesting to establish the connection responsive to:
(1) the online system determining that the sending user is authorized to exchange the first video data with the receiving user,
(2) the online system determining that the receiving user is authorized to exchange the second video data with the sending user (3) the online system receiving the indication that the receiving user is included in the second video data, and
(4) the online system receiving the indication that the sending user is included in first video data.

12. The computer program product of claim 11, wherein the indication that the receiving user is included in the second video data is received responsive to a determination at the receiving client device that the receiving user is included in the second video data using information maintained by the receiving client device.

13. The computer program product of claim 12, wherein the non-transitory computer readable storage medium further has instructions encoded thereon that, when executed by the processor, cause the processor to:
establish the connection between the online system, the sending client device, and the receiving client device responsive to the receiving client device interacting with a prompt approving the establishment of the connection, the prompt presented to the receiving client device responsive to an identified user in the second video data not being the receiving user according to the information maintained by the receiving client device.

14. The computer program product of claim 11, wherein at least one of the plurality of profiles further includes a time interval associated with when the one or more other users identified in the profile are authorized to exchange video data with the receiving client device.

15. The computer program product of claim 14, wherein automatically establishing the connection is further responsive to:
(5) determining the request was received at a time within the time interval.

16. The computer program product of claim 15, wherein the non-transitory computer readable storage medium further has instructions encoded thereon that, when executed by the processor, cause the processor to:
establish the connection between the online system, the sending client device, and the receiving client device responsive to the receiving client device interacting with a prompt that approves the establishment of the connection, the prompt presented to the receiving client device responsive to the time when the request was received is not within the time interval.

17. The computer program product of claim 11, wherein the non-transitory computer readable storage medium further has instructions encoded thereon that, when executed by the processor, cause the processor to:
store one or more rules for application to characteristics of the one or more users of the online system, a rule specifying one or more criteria that, when at least a threshold amount of the one or more criteria are satisfied by one or more characteristics of the user of the online system, authorize the user to exchange video data with the receiving client device.

18. The computer program product of claim 17, wherein a rule specifies one or more selected from a group consisting of: a connection to the receiving user maintained by the online system, a connection to an object maintained by the online system, an action stored by the online system in association with the user authorized to exchange video data with the receiving client device, and any combination thereof.

19. The computer program product of claim 17, wherein automatically establishing the connection is further responsive to:

determining, by the online system, that characteristics of the sending user maintained by the online system satisfy at least the threshold amount of the one or more criteria specified by a rule.

20. The computer program product of claim 18, wherein the non-transitory computer readable storage medium further has instructions encoded thereon that, when executed by the processor, cause the processor to:

determine, by the online system, that characteristics of the sending user maintained by the online system satisfy do not satisfy at least the threshold amount of the one or more criteria specified by at least one rule; and transmit from the online system to the receiving client device an indication to present a prompt to the receiving user identifying the sending user and for the receiving user to perform the interaction with the receiving client device in response to determining that characteristics of the sending user maintained by the online system satisfy do not satisfy at least the threshold amount of the one or more criteria specified by at least one rule.

* * * * *